United States Patent Office 2,764,421
Patented Sept. 25, 1956

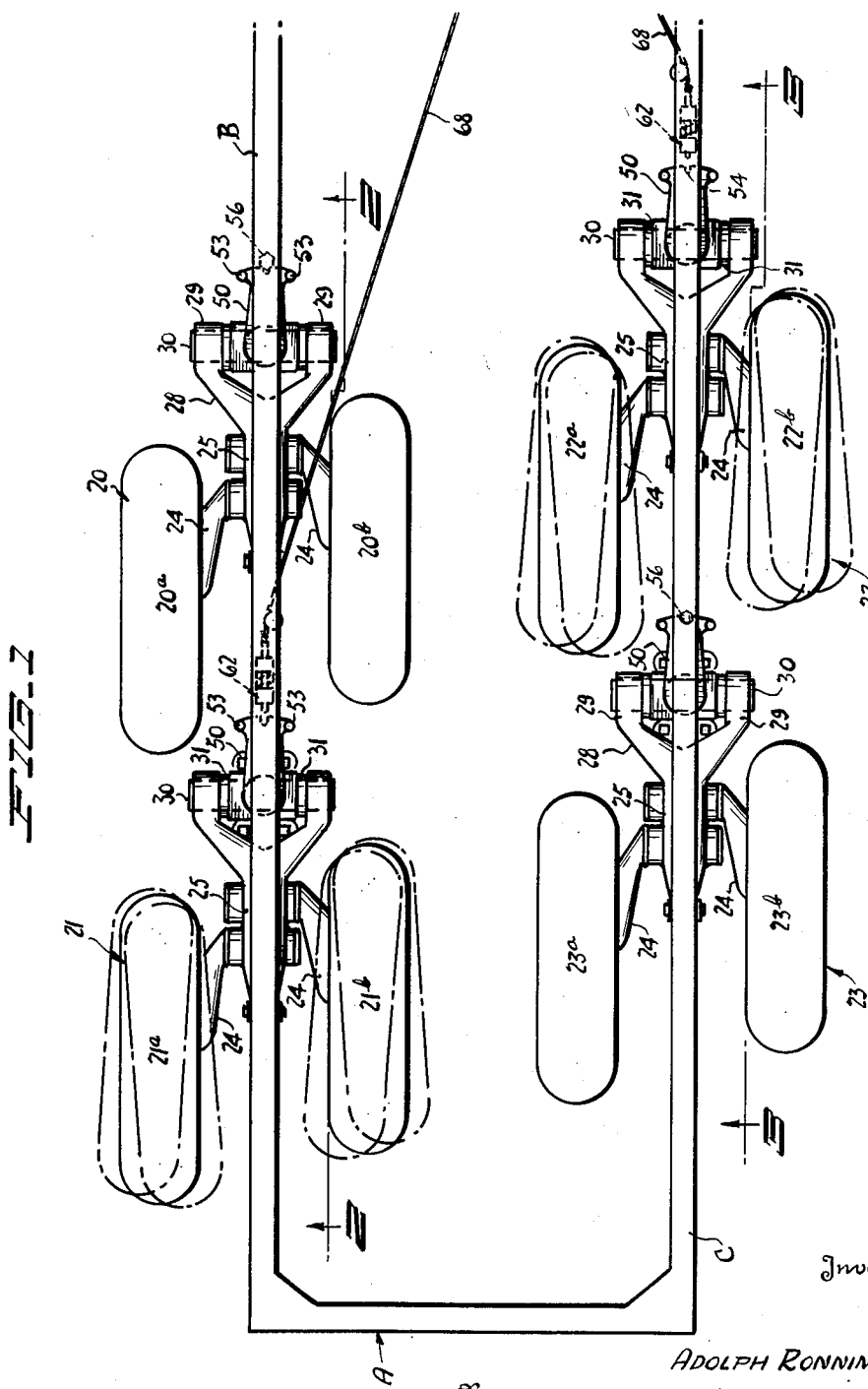

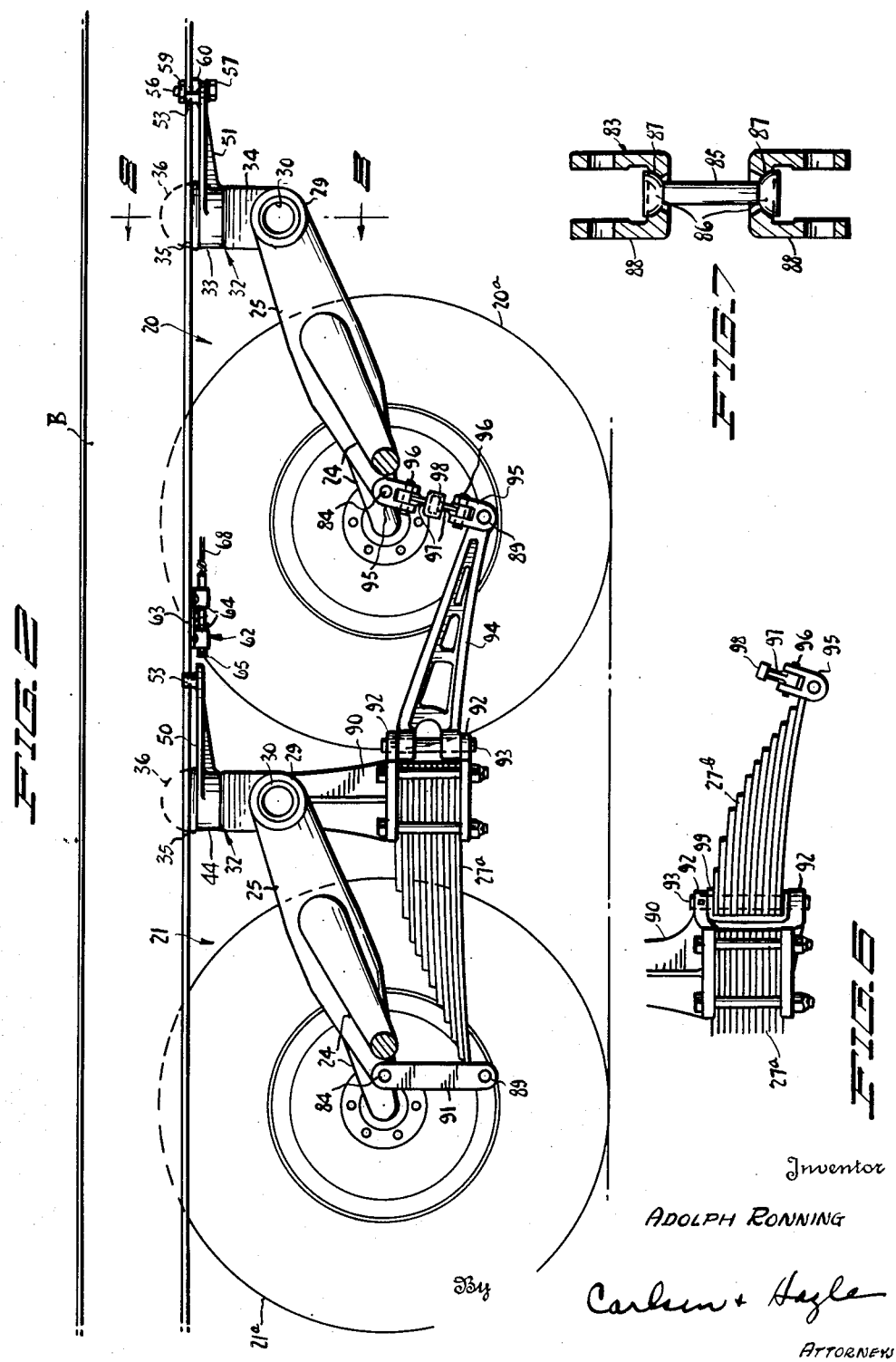

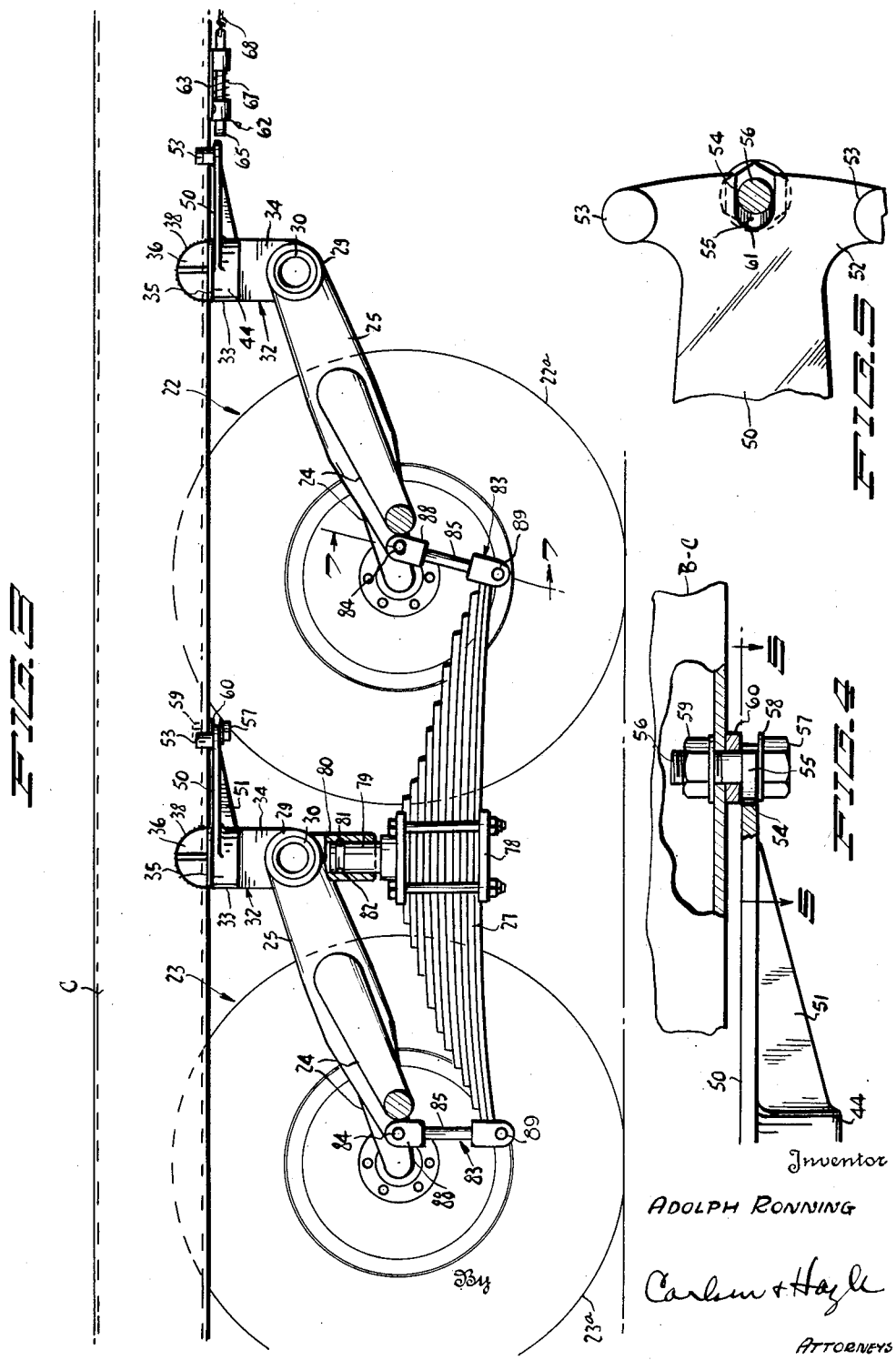

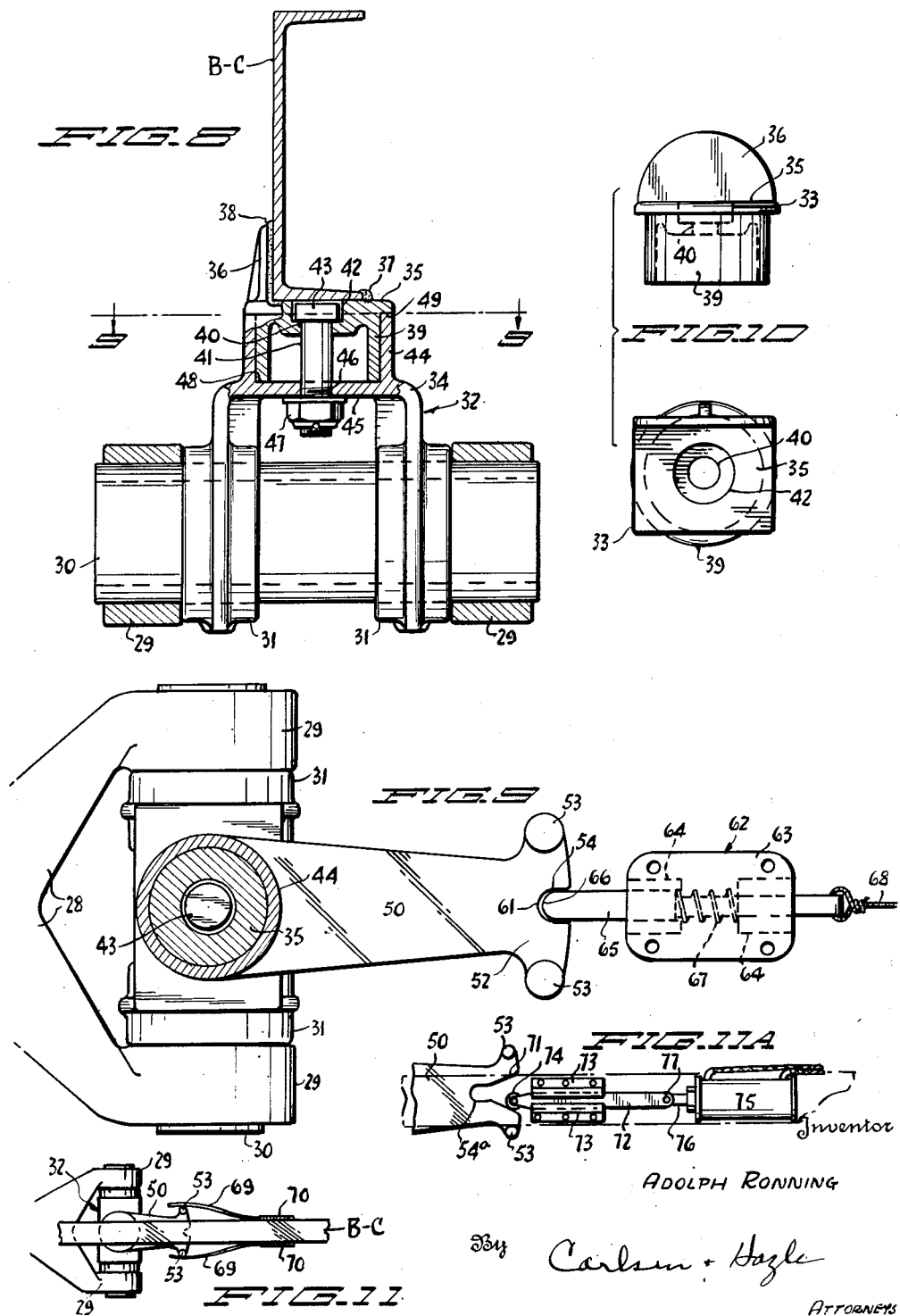

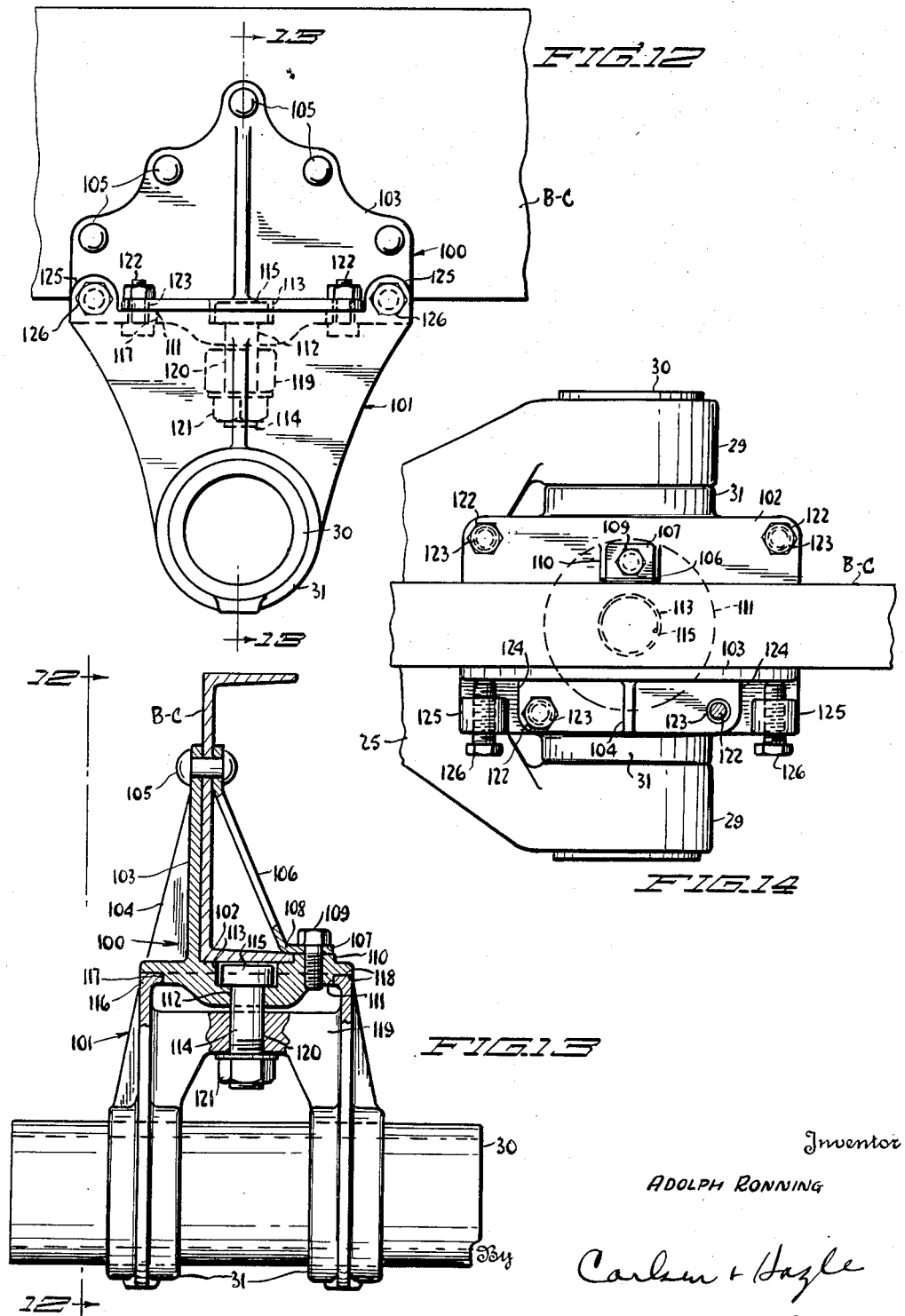

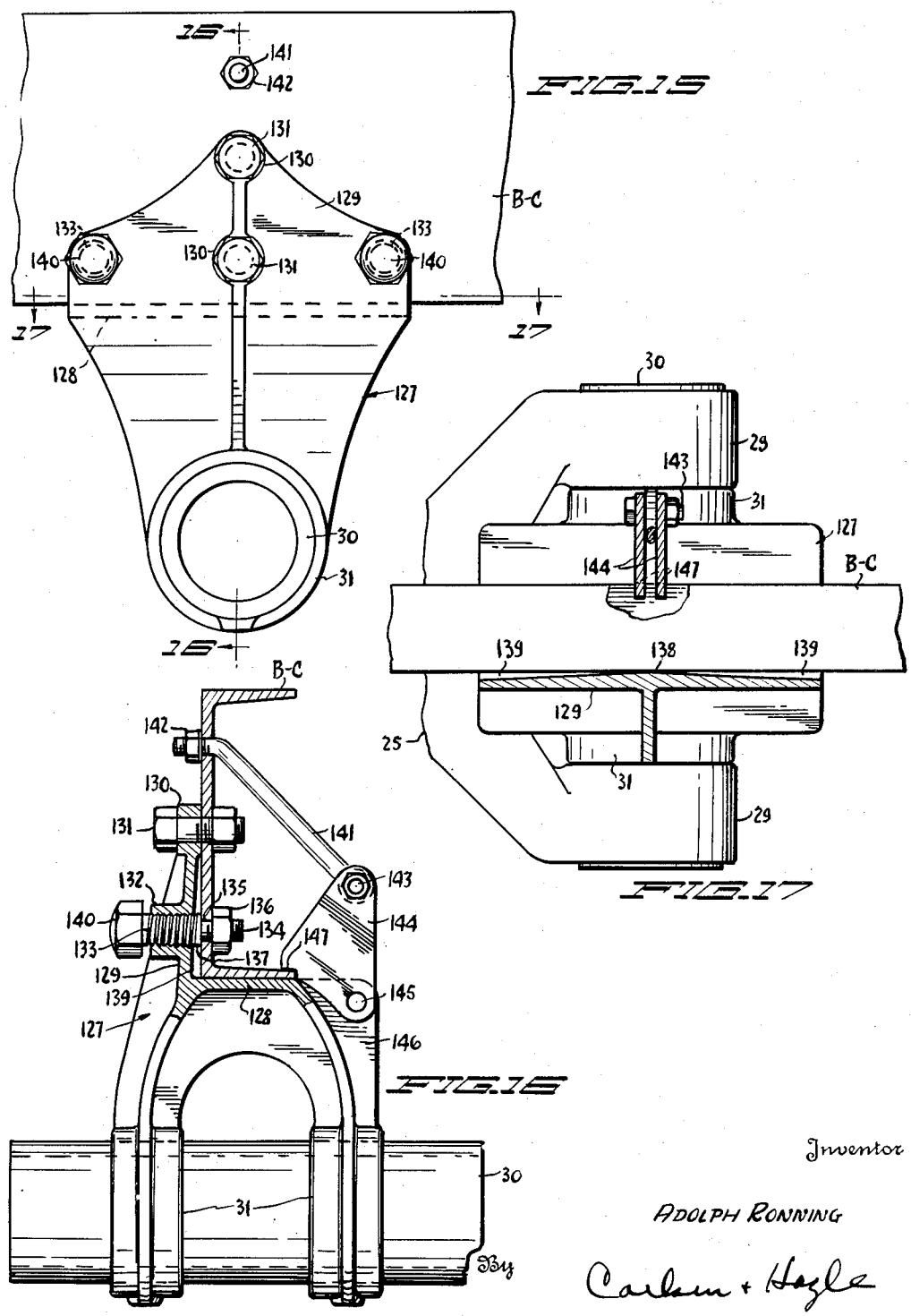

2,764,421

VEHICLE SUSPENSION WITH ADJUSTABLE AND CASTERABLE TANDEM WHEELS

Adolph Ronning, Minneapolis, Minn.

Application December 21, 1951, Serial No. 262,712

12 Claims. (Cl. 280—104.5)

This invention relates generally to improvements in tandem wheel suspensions for vehicles, particularly of the heavy-duty, semi-trailer type, and more specifically relates to improvements in adjustable and casterable tandem wheels for such equipment. In general the wheel suspension with which this invention is concerned is very similar to that disclosed in my co-pending application Serial No. 601,030, filed June 22, 1945, for Vehicle Wheel Compensating Suspension, now Patent No. 2,612,387, issued September 30, 1952, to which attention is invited for comparative purposes.

All tandem wheel suspensions, including that disclosed in my earlier application, are subject to one disadvantage in use and operation, occasioned by the fact that the tires must be forcibly slipped sidewise in one direction or another when the vehicle rounds a curve. There thus results a very considerable scuffing effect on the tires, as well as added stresses and strains upon the entire wheel suspension, and the high speeds at which such equipment is now operated and heavy loads to which the equipment is subjected all aggravate this condition, as is well understood by those skilled in the art. In my prior application Serial No. 198,080, filed November 29, 1950, now Patent No. 2,698,759, dated January 4, 1955, for Steering Controlled Tandem Wheel Suspension, and companion application Serial No. 224,148, filed May 2, 1951, now Patent No. 2,698,758, dated January 4, 1955, for Wheel Lift for Tandem Wheel suspensions, I have recognized this problem and offered solutions which involve lifting certain of the tandem wheels off the road surface, when taking a curve, in order to reduce the scuffing effect upon the tires. It is an important object of my present invention, however, to provide what may be described as a wheel mounting for the individual tandem units, by virtue of which certain of such units may be allowed limited or circumscribed castering action in such fashion that they will have a self-steering effect, enabling them to follow the curve being traveled by the vehicle, with a minimum of scuffing of the tires. It is also recognized in this art that these heavy-duty tractor-trailer combinations have a tendency to jackknife under certain conditions and it is believed that the limited castering action of certain of the tandem units will, to a worthwhile extent, counteract this jackknifing tendency by enabling the entire tandem assembly to travel in better fashion in a curved path, with reduced tendency to weave off to either side.

In my improved tandem wheel suspension the individual components all trail from their forwardly and upwardly located points of attachment to the vehicle frame, as pointed out in detail in my earlier applications, and by making these points of attachment pivotal about vertical axes it will, of course, be obvious that the wheels will have the well known castering action as the vehicle travels forwardly. Castering would be undesirable, however, when the vehicle is to be moved rearwardly and it is a further object of my invention to provide a wheel mounting with means for freeing the wheels for limited castering movement, or locking the wheels against such movement when the vehicle is moving rearwardly. In this connection the present application bears some similarity to my earlier application Serial No. 18,970, filed April 5, 1948, for Steerable Trailer Support, now Patent No. 2,605,114, issued July 29, 1952, and application Serial No. 26,203, filed May 10, 1948, for Steerable Trailer Front Wheel Mechanism, now Patent No. 2,650,100, issued August 25, 1953. In those applications I also provide casterable trailer supports, but in each case the wheels are free to caster about in backing up a trailer type of vehicle, in contrast to the present application wherein the reverse is true.

It is, of course, necessary in all tandem wheel suspensions that the wheels be properly lined up with the vehicle frame so that they will run true along the line of travel. As a result considerable precision is necessary in the manufacture and assembly of the vehicle frame, or chassis, and the wheel suspension assembly, and the necessary equipment and skilled manpower to obtain such precision represents a considerable expense. In my prior application Serial No. 601,030 the front and rear tandem units are arranged in transverse alignment and are pivoted upon transversely extending heavy tubes, which are in turn secured to the vehicle chassis. It will, of course, be observed that the use of such cross tubes guarantees the proper relative alignment of the wheel units connected thereto, but such tubes themselves are expensive and add weight to the vehicle. Better manufacturing practice, therefore, dictates that the tubes be eliminated and the necessary pivots for the individual units thus may be quite short and light in weight, but this in turn makes it necessary that the individual bracket connections between these pivots and the frame be very accurately aligned so that all of the wheels will track properly. It is a further and important object of my invention, therefore, to make these necessary bracket structures of relatively adjustable parts, one of which is secured to the vehicle or chassis, and the other of which actually carries the wheel suspension pivot. Such adjustment then ables me to swing these pivot connections about in a horizontal plane the minor distances necessary to line up the wheels and without requiring any great precision in the location of the fixed parts upon the chassis, overcoming the manufacturing problems discussed.

This problem of proper wheel alignment in a tandem suspension is also discussed and solved in another manner in my application Serial No. 224,147, filed May 2, 1951, now abandoned, for Vehicle Wheel Suspension Unit.

It is a further object of my present invention to provide an adjustable bracket mounting of this nature, which lends itself either to the adjustment of the wheels for proper tracking and alignment, or to the limited castering action of the wheels, so that they will self-steer around a curve with a minimum of scuffing of the tires, and thus these bracket assemblies may be embodied throughout and due to their versatility will enable the manufacturer to line up any desired pair of the wheels, and securely fix them in such alignment, and to then permit the controlled castering, self-steering action of the remaining wheels. It is a further, related object to provide a number of modifications of the bracket assemblies, some of which are specifically designed for wheel alignment adjustment only, as will be pointed out in more detail hereinafter.

Another object of my present invention is to provide general improvements in the basic type of wheel suspension to permit the necessary flexibility, so that certain of the wheels may caster, and in such fashion that this flexibility will have no effect whatever upon the compensating action of the suspension, which is so vital to its proper operation.

Still another object of my invention is to provide an adjustable and casterable wheel suspension with provision for convenient adjustment and control in a number of ways, with provision for spring-biased centering of the casterable wheel units, or for self-centering of these units when they are to be locked for rearward travel of the vehicle, and in general to provide bracket assemblies providing the necessary versatility and movability but which are engineered to successfully withstand the relatively tremendous strains to which they will be placed in a heavy-duty vehicle.

These and other more detailed and specific objects will be disclosed in the course of the following specification, reference being had to the accompanying drawings, in which—

Fig. 1 is a top plan view of the rear portion of a vehicle frame or chassis and with a compensating wheel suspension of the general type described and disclosed in my previous applications, but also embodying the essence of the present invention, the self-steering or castering action of certain of the wheels being indicated in broken lines.

Fig. 2 is an enlarged side elevation of the wheel suspension at one side of the vehicle, as viewed substantially along the line 2—2 in Fig. 1, and with the near wheels removed.

Fig. 3 is a similar view of the assembly at the other side, taken substantially along the line 3—3 in Fig. 1 and showing certain modifications.

Fig. 4 is an enlarged detail side view in partial vertical section showing the adjustment mechanism for lining up the wheels.

Fig. 5 is a fragmentary section and plan view along the line 5—5 in Fig. 4.

Fig. 6 is a fragmentary side elevation of the front to rear spring construction and illustrating a modification thereof.

Fig. 7 is an enlarged sectional detail view taken along the line 7—7 in Fig. 3 and showing one modification of the shackles for the spring.

Fig. 8 is an enlarged vertical cross sectional view, partially in elevation, and taken along the line 8—8 in Fig. 2.

Fig. 9 is a horizontal sectional and plan view along the line 9—9 in Fig. 8 and also showing a latch or lock means for the casterable wheel units.

Fig. 10 is a composite side elevation and top plan view of the upper portion of the bracket assembly of Fig. 8, which is secured to the vehicle frame.

Fig. 11 is a fragmentary plan view at the scale of Fig. 1 and illustrating the application of springs to the wheel mounting for self-centering the castering wheels.

Fig. 11A is a somewhat similar view at a larger scale illustrating diagrammatically a mechanism for automatically centering and locking the castering wheels when the vehicle is to move rearwardly.

Fig. 12 is a side elevation of a modified bracket assembly and adjacent portion of the vehicle frame with the wheel suspension itself omitted, this view being taken on about the line 12—12 in Fig. 13.

Fig. 13 is a vertical cross sectional view along the line 13—13 in Fig. 12, but with the lower portions of the assembly shown in elevation.

Fig. 14 is a plan view of the bracket assembly of Fig. 12, with the forepart of the wheel suspension in place upon the cross pivot but with the fastening rivets omitted for the sake of clarity.

Fig. 15 is a view similar to Fig. 12 but illustrating another modification of the bracket assembly.

Fig. 16 is a view similar to Fig. 13 but taken along the line 16—16 in Fig. 15.

Fig. 17 is a plan and horizontal sectional view taken approximately along the line 17—17 in Fig. 15.

Referring now more particularly and by reference characters to the drawing, the embodiments of my invention as disclosed in Figs. 1–10 will be first described. In general this wheel suspension is similar in construction and operation to that disclosed in my prior application Serial No. 601,030, in that it comprises four identical wheel pairs, or sets, which are here designated generally at 20, 21, 22 and 23, and which are arranged beneath teh rear end of the vehicle frame or chassis, designated at A, which may be of any conventional construction. This frame, however, is here shown as having spaced side members or channels B and C and the wheel sets 20 and 21 are disposed beneath the side member B, while the wheel sets 22 and 23 are disposed beneath the other member C, as best shown in Fig. 1. Also as there best shown, the wheel set 20 comprises individual pneumatic-tired wheels 20a and 20b, the wheel set 21 has the similar wheels 21a and 21b, the wheel set 22 has the wheels 22a and 22b, and the wheel set 23 has the individual wheels 23a and 23b. Thus there is formed an eight wheel suspension made up of four spaced suspension units, each of which has individual wheels, and in each case the individual wheels are interconnected for relative differential up and down movements. For this purpose the wheels are journaled at the rear ends of cranked axles, indicated throughout at 24, and the forward ends of such axles are turned transversely in opposite directions and journaled in housing members 25. Within these members 25 the forward ends of the axles 24 are connected by meshing gears, or other suitable means (not shown), so that as either axle moves downward with its associated wheel the other must move upward a corresponding distance, and vice versa. While I do not here detail this differential mechanism one example thereof may be found in my U. S. Patent No. 2,217,817, issued October 15, 1940. The housing members 25 are in turn pivotally attached at their forward ends to the vehicle upon horizontal transverse axes and in such fashion that the housing members, with their attached wheels, may swing in vertical planes with repect to the vehicle. The wheel sets 20—21 and 22—23 are then compensatingly connected fore and aft at each ide of the vehicle by a heavy leaf spring, which I designate at 27 in Fig. 3, which not only provides spring suspension and shock absorption but also has a walking beam action as described in my earlier application. Such details of this construction as necessary to an understanding of my present invention will be set forth hereinafter, but at this point it will, of course, be understood that the whole purpose of the differential and compensating connections between the wheels and wheel sets is to evenly and equally distribute the load to the individual wheels and to permit them to travel over road surface irregularities with the transmission of a minimum vertical deflection and acceleration to the vehicle itself.

In my prior application Serial No. 601,030 the forward wheel sets, corresponding to those shown at 20—22 herein, are transversely aligned and the pivot connections for their associated housing members 25 are made to a common cross tube rigidly suspended beneath the side members of the frame. Similarly the rear wheel sets, corresponding to wheel sets 21—23, are so aligned and mounted, but as stated hereinbefore it has been found expedient to eliminate these cross tubes and provide individual pivot mountings for the housings 25, as will presently appear. With the four wheel sets or pairs thus freed of any necessity for transverse alignment and connection, I may prefer to arrange them in the diagonally related pattern, as seen in Fig. 1, wherein the wheel set 20 is located rearwardly with respect to its mating opposed wheel set 22, and the same as to the sets 21—23. This is by way of explanation only of the pattern illustrated in Fig. 1 and which is not material to the present invention, being the subject matter of another application to which specific reference is not regarded as necessary herein.

In accordance with this invention the actual wheel mounting or bracket assemblies for the four sets are all identical, and one will be described in detail with corresponding reference characters applied throughout. For their pivot mounting the forward ends of the housing members 25 are bifurcated, as indicated at 28, providing aligned and transversely spaced, apertured bearing ends 29, for the mounting of which I provide comparatively short pivot tubes 30. Between the bearing ends 29 the pivot tubes 30, as best seen in Fig. 8, are carried in transversely spaced and depending bearings 31, forming part of a bracket assembly indicated generally at 32. It will, of course, be obvious that the proper alignment of the wheels with the vehicle and with the direction of travel will require that these pivot tubes 30 be precisely positioned at right angles to the direction of travel; and the bracket structure now to be described provides for such accurate alignment and also permits castering action about vertical axes, in any practical combination. For this purpose the bracket 32 is made in two upper and lower, pivotally related sections or parts and the upper part 33 is secured to the frame member B or C, as the case may be, while the lower part 34 includes the bearings 31 which support the pivot tube 30. The upper part 33 of the bracket has a rectangular base plate 35 adapted to fit up against the underside of the frame member B or C and also has an upstanding ribbed web 36 to fit closely against the outer side of the web of said member. When the bracket has been assembled this upper part 33 is welded around its exposed edges, as indicated at 37—38, to the frame member, thus forming a neat assembly and one which is extremely strong. In addition, the upper part 33 of the bracket has a depending annular bearing 39 and the base plate 35 is formed with a vertical opening 40, concentric with the bearing 39, for the accommodation of an assembly bolt 41. The base plate 35 is further thickened about its center portion so that it may be counterbored or recessed at 42 to receive and clear the head 43 of the bolt 41, as seen in Figs. 8 and 10. The lower section 34 of the bearing assembly has a corresponding upwardly extending, annular bearing 44 to telescope over the bearing 39, and bearing 44 is formed upon a cross web 45 from the end of which depend the bearings 31. This web 44 is also provided with an opening 46 to pass the bolt 41, and below the web a nut 47 is turned up on the bolt to hold the bracket parts in assembled relation. It will be observed that the bolt 41 does not itself act as the pivot and that the necessary relative rotation or swiveling takes place as between the bearings 39—44, the meeting peripheral surfaces of which are smoothly finished for this purpose. In addition, the opposite ends 48 and 49 of the bearing 39—44 are machined off smoothly to take the vertical load, and thus more than adequate bearing surface is provided to absorb the very considerable stresses to which the assembly will be subjected in use.

It will, of course, be understood that this two-part, pivotally related bracket structure will permit the connected wheel sets to swing in horizontal planes, about an upright axis and with respect to the vehicle. It is, however, necessity to restrict and limit this swinging movement, and for this purpose the lower bracket sections 34 are each provided with a forwardly extending, flat stop arm 50, formed integrally about the outside of the bearing 44, and suitably braced by an integral rib 51. The stop arms extend forwardly immediately beneath the channels B and C and at the forward ends the arms are widened at 52, forming projections from which there upwardly extends spaced stops 53 at opposite sides of the said channels. The distance between the stops 53 is greater than the width of the lower flanges of the channels B or C, but the stops project upwardly far enough to strike the opposite edges of the channels, thus limiting the swinging movements of the wheel sets in both directions. In addition, each widened forward end of the associated stop arm 50 is provided with a forwardly opening and centrally located notch 54, which may be utilized for locking the wheel sets against any castering or swinging motion whatsoever.

Referring now particularly to Figs. 4 and 5, it will be noted that I make use of these notches 54, in the arms 50, for the precise alignment of the associated wheel sets by means of a cam 55 which is formed upon a lock bolt 56, extending upwardly through the adjacent lower flange of the channel B or C. The bolt 56 has a head 57 at its lower end and a washer 58 between the head and arm, while the upper end of the bolt is threaded to receive a nut 59 by which the assembly is pulled tight to the channel. A spacing washer 60 is disposed upon the bolt upon the arm 50 and lower surface of the channel, so that this assembly may be pulled very tight without stressing the stop arm. The cam 55 has a rounded nose to fit the similarly rounded inner end 61 of the notch 54, and it will now be understood that movement of the bolt 56, in opposite directions, will cause this cam to correspondingly position the stop arm 50 and make precise horizontal adjustments of the associated wheel set. Thus after assembly of the wheel suspension upon the vehicle all of the wheels may be accurately aligned and locked in such alignment by the operation of these adjusting cams, making it unnecessary to so precisely pre-assemble the frame and suspension as to provide for the necessary alignment, so that the manufacture and assembly are materially simplified.

As stated hereinbefore, it is very desirable, however, that at least certain of the wheel sets be permitted the limited castering and self-steering action which is possible by the spacing of the stops 53, and in such case, of course, the adjusting cams 55 and locking bolts 56 are omitted. Due to the fact that the four wheel sets are all individually mounted it is possible to align and lock any two sets, while leaving the remaining two sets free to caster, thus insuring proper travel of the vehicle while reducing the skidding and scuffing of the tires as the vehicle travels around a curve. The casterable wheel sets may be and preferably are the two forward sets 20—22, but may be the two rear sets 21—23, or the diagonally related sets 20—23, or 21—22, and in Fig. 1 I have shown the latter wheel sets as free to caster, while the wheel sets 20—23 are aligned and adjusted by the cams and locking bolts. I find that a total castering range of ten degrees, or five degrees each side from center, will permit the castering wheels to properly track on a turn radius of approximately forty-five feet, and thus they will track around highway curves and most city streets with a material reduction in the scuffing of the tires and the usual aggravated side stress upon the wheel suspension. When the vehicle is to be moved rearwardly it is, of course, desirable to lock the castering wheels in position for straightaway travel, and for this purpose I again utilize the notches 54 and the stop arms 50 and provide at each castering wheel set a latching or lock mechanism, designated generally at 62, the construction of which is best shown in Fig. 9. Any suitable bracket 63 is secured to the underside of the associated side channel of the frame and has spaced bearings 64, bored out forwardly and rearwardly, to slidably accommodate a reciprocating latch plunger 65. The bracket is, of course, secured to the channel forwardly of the associated stop arm 50 and the rear end of the plunger 65 is rounded off at 66 to enter the notch 54 when the wheels are in proper straightaway position, and in such condition the plunger will positively lock the wheels against castering movements. The plunger 65 is yieldably urged rearwardly, for thus entering the notch 54, by a coil spring 67 located between the bearings 65 and around the reduced forward portion of the plunger; and each plunger may be pulled forward, or released to move rearward, by any suitable means such as here diagrammatically designated as cable 68. Such cables may extend forwardly into the truck cab (not shown) for manual actuation, but I do not, of course, limit myself to this particular operating means, since fluid or air actuated cylinders may be used for controlling the plunger 65, or they may be surge actuated by any well known form of surge responsive device, or by any of the various mechanisms for the purpose disclosed in my applications Serial Nos. 18,970 and 26,203 previously mentioned herein.

Alternatively it may be practical to yieldably bias the casterable wheels to their center or straightaway positions and eliminate a positive stop, and in Fig. 11 I show bowed leaf springs 69, which are welded at their forward ends 70 to the channel B or C, and which bear inwardly upon the stops 53 for this purpose, as will be readily understood.

It may also be desirable to positively center the wheels by the means which locks them in straightaway positions for rearward travel, and in Fig. 11A I show a variation in the stop arm 50, wherein it has a forwardly flaring throat 71 terminating in a narrow rear portion 54a. In this case also I show a heavy sliding plunger 72 slidably carried in opposed side brackets 73 secured to the underside of the frame channel, and provided at its rear end with a roller 74 to coact with the throat 71, so that upon rearward movement of the plunger it will cam the stop arm 50 and the associated wheel set into straightaway position before the rollers enters the notch 54a and locks. In this case also I show an air or fluid cylinder 75, having its reciprocating plunger 76 pivotally connected at 77 to the forward end of the plunger 72 for actuating the plunger, and it will be understood that the heavy side bearing 73 will take the strain of centering and holding the wheel sets against castering movement, without undesirably transmitting this strain to the plunger and piston.

As briefly stated hereinbefore the wheel sets at each side of the vehicle are connected front to rear by a suspension and equalizing spring 27, and it is necessary, in order to accommodate the horizontal swinging and castering motions of the wheel sets as well as their up and down compensating motions, that their connections to this spring and the mounting thereof be sufficiently flexible to permit such relative motions. In Fig. 3 I show the spring 27 as secured in a center clamp structure 78 having an upstanding pivot stub 79 received in a depending bearing 80 which is suspended upon the pivot tube 30 between the bracket bearings 31. A pin 81 is secured through the bearing 80, tangential to a groove 82 in stub 79 to hold this assembly in place, while permitting horizontal movements of the spring at its opposite end. The front and rear ends of the spring 27 are then connected by shackles, designated generally at 83, to transverse pivot connections 84 at the extreme rear ends of the housing members 25, and to accommodate the various motions it is also necessary that these shackles embody what may be called a universal joint effect. As seen in Fig. 7, each shackle accordingly comprises a center pin 85, upset to form substantially hemispherical ends 86, which play in bearings 87 in upper and lower U-shaped clips 88. The upper clip 88 is connected to the associated housing member by the aforesaid pivot 84, while the lower clip is correspondingly pinned at 89 to the adjacent end of the spring. The shackles as thus constructed will properly transmit the load to the spring 27, but will accommodate themselves to the necessary swinging movements of the parts as the wheels caster.

Alternatively, and as seen in Fig. 2, the spring itself may be made up in two sections and as there shown the spring comprises a rear leaf section 27a, clamped in a bracket assembly 90, by which it is connected to the rear pivot tube 30 in exactly the manner described in my application Serial No. 601,030. In this case also the rear end of this spring section 27a is connected by a straight shackle 91 to the rear housing member 25, as in Serial No. 601,030. The clamp assembly for the spring is then provided with forwardly extending, vertically apertured ears 92 receiving a vertical pivot pin 93, and a structural arm or beam section 94 is pivotally connected to this pin, so that horizontal hinge motion is possible between the forward and rearward portions of the spring assembly. the forward end of the arm section 94 is then shackled to the forward housing member 25 and in this case the shackle comprises upper and lower U-shaped clips 95, to which are pivoted at 96 upper and lower members 97 having a swivel connection 98. This form of shackle will permit all of the necessary movements, but it is believed that the shackle 83 previously described is preferable, since it is somewhat simpler in construction.

The structural arm section 94 of the spring will, of course, have little or no resiliency, placing all of the flexing load upon the rear section 27a, but in Fig. 6 I show a second, forward spring section 27b, adapted to replace the structural section 94, so as to provide flexibility throughout. In this case the rear ends of the individual spring leaves of the spring section 27b will be apertured and held in a clamp 99 and will in turn be pivotally carried upon the pin 93 between the clamp ears 92, so as to provide for the necessary horizontal hinge action.

The importance of the castering or self-steering action of a part of the wheel sets in a tandem wheel suspension of this nature cannot be overemphasized, since it will solve one of the greatest problems in the practical operation of this type of equipment. Furthermore, in the wheel suspension of my invention complete versatility is permissible in the selection of the wheels to be castered, although from the practical standpoint I am presently of the opinion that best results will be obtained where the two front wheel sets are arranged to caster and the two rear wheel sets are simply adjusted and fixed in proper aligned positions. It will be noted, however, that the bracket structure will be used in its entirety throughout, requiring no large stock of dissimilar parts to be carried in order to make up suspensions according to any desired characteristics. Difficulty is sometimes encountered in self-steerable wheels, due to their tendency to shimmy, but in this case the differentially mounted wheels will cause them to maintain even load distribution and road contact and it is not believed that this tendency will be at all present in my wheel suspension even with certain wheels freed for self-steering. In addition, the manufacturing of the suspension assembly is greatly facilitated, since extreme precision and expensive jigs and fixtures are not required for the proper alignment of the individual components. While I have here described the castering wheels as equipped with means for locking them in straightaway positions when the trailer is to be backed up, it may be noted that where these wheels are also picked up, such as set forth in my applications Serial Nos. 198,080 and 224,148, it would not, of course, be necessary to use such locks. It is further to be noted that the lock structures here provided are of the fail-safe type and should any failure occur in the mechanism by which the latches are actually operated, then the springs would force the latches into their locked position, which is a desirable safety factor.

In Figs. 12–14 I illustrate a modified type of bracket construction, specifically intended for the precise alignment of the wheels, and use of which may be preferable in certain circumstances. In this case the pivot tube 30 for the wheel suspension unit is again carried in bearings 31, which depend from the bracket structure beneath the side channel B or C of the frame, and here also the bracket is made in two relatively movable, upper and lower parts 100 and 101. The upper bracket part 100 has a base plate 102 to fit beneath the associated channel and an upstanding flange 103, with a bracing rib 104. The flange 103 fits tightly against the outside of the channel and is provided at spaced points with openings for the accommodation of suitable fasteners, such as bolts, or the rivets 105 here shown for convenience. In addition, the base plate 102 is pulled up tight against the underside of the channel, and locked against any relative twisting movement, by means of a center brace or strap 106, which is held at its upper end by the center rivet 105, and which angles downwardly and inwardly therefrom where the brace is provided with a horizontal turned end 107, a portion 108 of which bears downwardly upon the edge of the channel. This end 107 of the brace is pulled down tight by a cap screw 109 against a boss 110 formed upon the upper surface of the base plate 102, and this boss 110, plus the down pressure of the brace at 108, will positively lock this section of the bracket to the channel, as will be readily understood.

In addition, the upper bracket section 100 has a depending circular bearing 111 and concentric therewith the base plate of the bracket is thickened to accommodate an opening 112 and recess 113. An assembly bolt 114 is passed downward through the opening 112, with its head 115 in the recess 113, as seen in Fig. 13. The lower bracket section 100 has an upper portion 116 formed with a bearing opening 117 to closely, rotatably fit the bearing 111, thus providing the desirable large diameter bearing, and in addition the meeting surfaces 118 of the bracket sections about the bearing are accurately machined to take the load. The aforesaid spaced bearings 31 depend from the opposite sides of the lower bracket section and are joined by a transverse bridge 119 having a center aperture 120 to pass the bolt 114. Beneath the bridge 119 a nut 121 is turned up on the bolt 114 and here again this bolt serves merely to hold the bracket parts in assembly and does not itself act as the pivot.

The base plate 102 and upper portion of the lower bracket section are substantially rectangular in shape and radially outward of the bearing 111 these parts are further joined by hold down or clamp bolts 122, but the openings 123 for accommodating these bolts are larger than the bolts themselves to permit limited relative movement of the lower bracket section about a vertical axis. At one side the base plate 102 is cut away at its corners 124 to expose the upper surface of the lower bracket section 101, and from these exposed corners there upwardly project integral tapped bosses 125, through which are mounted adjusting set screws 126. The set screws 126 bear inwardly against the lower portions of the flange 103, and thus it will be apparent that by loosening the hold down bolts 122, and then oppositely adjusting the set screws 126, the lower bracket section 101 may be shifted about in a horizontal plane to very precisely align the associated wheel sets. Following such adjustment the bolts 122 are, of course, pulled down tight and the bracket assembly is then firmly and permanently locked.

In Figs. 15–17 I show a third form of adjustable bracket construction, but in which the bracket is itself made in one piece, instead of the two relatively movable sections characteristic of the structures previously described. Here also the pivot tube 30 is carried in transversely spaced bearings 31 and they depend from the bracket, designated generally at 127. The bracket has a base plate 128 to bear upwardly against the underside of the channel B or C, and at one side the bracket has an upwardly extending, integral flange 129 to fit against the outside vertical face of the channel. Along the vertical center line the vertical flange 129 has spaced apertured bosses 130 to pass vertically spaced clamp bolts 131 extending through the channel, and also adjacent the lower edge of the channel, and at forwardly and rearwardly spaced points the flange 129 has larger tapped bosses 132 in which are threaded "set" screws 133. These screws 133 are diametrically reduced at their inner ends 134 where they pass through registering openings 135 in the channel, and lock nuts 136 are screwed on these reduced inner ends of the screws inside the channel. These nuts 136 permit the shoulders 137, formed by such diametrical reduction, to be pulled up tight to the channel, as seen in Fig. 16. Referring particularly to Fig. 17, however, it will be noted that the inner surface of the flange 129 contacts the adjacent face of the channel B or C only along the vertical center line at 138 and recedes from the channel angularly in forward and rearward directions, so that there are substantial spaces 139 between flange and channel adjacent the ends of the bracket. Thus it is possible, by loosening the center bolts 131 slightly, to turn the adjusting screws 133 by their heads 140 and rock the entire bracket in a horizontal plane about its center contact 138 with the channel, such movement, of course, serving to swing the associated wheel sets as necessary to bring them into proper tracking alignment. Following such adjustments of the screws 133 the nuts 136 are then turned up tight again and the adjustment is finally fixed by retightening the center bolts 131.

Here again a diagonal brace 141 in the form of a rod is provided at the center of the bracket structure and at its upper end the brace is turned outward through the channel and held by a nut 142. The lower inner end of the brace 141 is then pivoted at 143 between spaced, triangular clamp plates 144 which are hinged at their lower corners 145 to a flange 146 formed on the bracket. These plates 144 are notched at their remaining corners at 147 to tightly fit and pinch the adjacent lower edge of the channel, and when the brace 141 is pulled up tight by the nut 142 this engagement of the plates with the channel will positively prevent any relative lateral twisting motions between bracket and frame.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle supporting assembly, front and rear tandem wheels at each side of the vehicle and supportably connected thereto with provision for limited up and down movements with respect to the vehicle, means connecting all of the wheels to the vehicle for horizontal swinging adjustments about upright axes to align and track the wheels, and means for adjusting and locking a part of the wheels about said axes while leaving the remainng wheels free for castering movements about the said axes.

2. In a vehicle wheel suspension of the character described, the vehicle having a frame, the combination comprising a pair of tandem wheels at each side of the vehicle, means for supportably connecting the frame to these wheels and including members extending forwardly from the wheels and a separate bracket assembly for connecting the forepart of each member to the frame, said bracket assemblies each having an upper section secured to the frame and a lower section connected to the said member, means connecting the bracket assembly sections for relative rotation about generally upright axes whereby the wheels may caster, means for adjustably locking a part of the bracket assemblies to hold the associated wheels in proper alignment for straightaway travel of the vehicle, and means for limiting the movement of the remaining bracket assemblies to restrict the castering action of the associated wheels.

3. In a vehicle wheel suspension of the character described, the vehicle having a frame, the combination comprising a pair of tandem wheels at each side of the vehicle, means for supportably connecting the frame to these wheels and including members extending forwardly from the wheels and a separate bracket assembly for connecting the forepart of each member to the frame, said bracket assemblies each having an upper section secured to the frame and a lower section connected to the said member, the upper and lower sections of each bracket assembly having cooperating bearing parts with wide bearing areas and assembly bolts concentric with the bearing parts for holding the sections in assembly, said bearing parts allowing the lower bracket sections to swivel about generally upright axes and the associated wheels to caster, and means for limiting and controlling the castering action of the wheels.

4. In a vehicle wheel suspension of the character described, the vehicle having a frame, the combination comprising a pair of tandem wheels at each side of the vehicle, means for supportably connecting the frame to these wheels and including members extending forwardly from the wheels and a separate bracket assembly for connecting the forepart of each member to the frame, said bracket assemblies each having an upper section secured to the frame and a lower section connected to the said member, means pivotally connecting the bracket sections whereby the lower section will swivel about upright axes and the connected wheels will caster from said axes, stop arms extended from the movable lower bracket sections and having spaced stops to oppositely engage the vehicle frame and define the range through which the wheels caster, and means separate from the stops for positioning the stop arms of a part of the bracket assemblies and lining up the associated wheels for straightway travel of the vehicle.

5. In a vehicle wheel suspension of the character described, the vehicle having a frame, the combination comprising a pair of tandem wheels at each side of the vehicle, means for supportably connecting the frame to these wheels and including members extending forwardly from the wheels and a separate bracket assembly for connecting the forepart of each member to the frame, said bracket assemblies each having an upper section secured to the frame and a lower section connected to the said member, means pivotally connecting the bracket sections whereby the lower section will swivel about upright axes and the connected wheels will caster from said axes, stop arms extended from the movable lower bracket sections and having spaced stops to oppositely engage the vehicle frame and define the range through which the wheels caster, the said stop arms having notches, and cams carried by the frame and adjustable in the notches of a part of said stop arms to position the arms and bracket assemblies and line up part of the wheels for straightaway travel while leaving the remaining wheels free for limited castering action.

6. A vehicle suspension including two pairs of tandem wheels, mounting means connecting the wheels to the vehicle, said means for two of said wheels having upright pivots whereby the associated wheels will caster with a self-steering action as the vehicle travels a curve, said mounting means for the castering wheels including longitudinally extending notched stop arms swingable with the wheels as they caster, and remotely controlled latch means on the vehicle coacting with the notched arms to selectively lock the wheels against castering movements.

7. A vehicle suspension including two pairs of tandem wheels, mounting means connecting the wheels to the vehicle, said means for two of said wheels having upright pivots whereby the associated wheels will caster with a self-steering action as the vehicle travels a curve, arms etxending from the mounting means, and springs oppositely engaging the arms on said mounting means to yieldably center the castering wheels and restrain them against opposite castering movements.

8. A vehicle suspension including two pairs of tandem wheels, mounting means connecting the wheels to the vehicle, said means for two of said wheels having upright pivots whereby the associated wheels will caster with a self-steering action as the vehicle travels a curve, the said mounting means for the castering wheels including longitudinally extending stop arms having notches and flaring throats leading to said notches, and reciprocating latch bars having means for engaging said throats and then the notches to first center the castering wheels and then lock them against castering movements.

9. In a vehicle suspension of the character described, a pair of tandem wheels at each side of the vehicle, mounting means forward of each wheel connecting the same to the vehicle for relative up and down movements, a spring extending forwardly and rearwardly at each side of the vehicle and fulcrumed between its ends to the vehicle, shackles connecting the front and rear ends of the springs to the tandem wheels, the mounting means for one wheel at each side of the vehicle including an upright pivot about which the associated wheel will caster, and the springs each comprising two hinged sections connected about an upright pivot axis to accommodate the castering movements of the connected wheels.

10. In a vehicle suspension of the character described, a pair of tandem wheels at each side of the vehicle, mounting means forward of each wheel connecting the same to the vehicle for relative up and down movements, a spring extending forwardly and rearwardly at each side of the vehicle and fulcrumed between its ends to the vehicle, multi-part shackles connecting the front and rear ends of the springs to the tandem wheels, the mounting means for one wheel at each side of the vehicle including an upright pivot about which the associated wheel will caster, means accommodating the springs to the lateral swinging castering action of the wheels, and the said shackles having multiple pivot connections between their parts with universal joint action for the same purpose.

11. A tandem wheel suspension for a vehicle, comprising front and rear wheels at each side of the vehicle, means individually connecting each wheel to the vehicle, spring means suspending the weight of the vehicle on the wheels and including differential compensating mechanism distributing the load equally to the wheels, all of said first mentioned means including caster pivots about which the wheels may caster, means permanently locking the rear wheels against castering action, and separate means controllably and releasably latching the front wheels against castering action.

12. In a vehicle supporting assembly, front and rear tandem wheels at each side of the vehicle and supportably connected thereto with provision for limited up and down movements with respect to the vehicle, means connecting all of the wheels to the vehicle for horizontal swinging adjustments about upright axes to align and track the wheels, means for adjusting and permanently locking a part of said wheels about said axes after the wheels are arranged in proper tracking positions, and separate and releasable means for latching the remaining wheels against movement about said axes when such movement is undesirable as for example when the vehicle is moved rearwardly.

References Cited in the file of this patent

UNITED STATES PATENTS

| | | |
|---|---|---|
| 746,900 | Towsley | Dec. 15, 1903 |
| 1,635,389 | Shuffleton | July 12, 1927 |
| 1,739,716 | Fisher | Dec. 17, 1929 |
| 2,033,298 | Pribil | Mar. 10, 1936 |
| 2,042,780 | Greer | June 2, 1936 |
| 2,068,160 | Zeindler | Jan. 19, 1937 |
| 2,269,728 | Mills | Jan. 13, 1942 |
| 2,272,572 | Merry | Feb. 10, 1942 |
| 2,296,681 | Merry | Sept. 22, 1942 |
| 2,361,166 | Ayers | Oct. 24, 1944 |
| 2,390,912 | Ayers | Dec. 11, 1945 |
| 2,599,469 | Merry | June 3, 1952 |
| 2,624,593 | Stover | Jan. 6, 1953 |